United States Patent
Lindbloom

(10) Patent No.: US 8,488,875 B2
(45) Date of Patent: Jul. 16, 2013

(54) COLOR SELECTION AND/OR MATCHING IN A COLOR IMAGE

(71) Applicant: COREL CORPORATION, Inc., Ottawa (CA)

(72) Inventor: Bruce J. Lindbloom, Eden Prairie, MN (US)

(73) Assignee: COREL CORPORATION, Inc., Ottawa (CA)

( * ) Notice: Subject to any disclaimer, the term of this patent is extended or adjusted under 35 U.S.C. 154(b) by 0 days.

(21) Appl. No.: 13/622,252

(22) Filed: Sep. 18, 2012

(65) Prior Publication Data
US 2013/0016903 A1    Jan. 17, 2013

Related U.S. Application Data

(62) Division of application No. 11/514,480, filed on Aug. 31, 2006, now Pat. No. 8,270,709.

(51) Int. Cl.
*G06K 9/00*    (2006.01)

(52) U.S. Cl.
USPC ......................................................... 382/162

(58) Field of Classification Search
USPC .................... 382/28–283; 358/1.9, 517–518; 345/589–604; 348/661–663
See application file for complete search history.

(56) References Cited

U.S. PATENT DOCUMENTS

| | | | |
|---|---|---|---|
| 4,710,806 A * | 12/1987 | Iwai et al. ................. | 375/240.01 |
| 5,459,530 A | 10/1995 | Andersson et al. | |
| 5,495,428 A * | 2/1996 | Schwartz ...................... | 382/164 |
| 5,680,327 A | 10/1997 | Cook et al. | |
| 5,798,943 A | 8/1998 | Cook et al. | |
| 6,377,702 B1 * | 4/2002 | Cooper ......................... | 382/167 |
| 6,434,269 B1 | 8/2002 | Hamburg | |
| 6,650,772 B1 | 11/2003 | Inoue et al. | |
| 6,674,907 B1 | 1/2004 | Shum et al. | |
| 6,771,813 B1 | 8/2004 | Katsuyama | |
| 6,791,573 B2 | 9/2004 | Hamburg | |
| 7,085,413 B2 | 8/2006 | Huang et al. | |
| 8,270,709 B2 | 9/2012 | Lindbloom | |
| 8,368,956 B2 * | 2/2013 | Campbell et al. .............. | 358/1.9 |
| 2004/0264741 A1 | 12/2004 | Omatsu et al. | |

OTHER PUBLICATIONS

International Search Report dated Jul. 10, 2007, PCT/US06/34420, 2 pages.

* cited by examiner

*Primary Examiner* — Ishrat I Sherali
(74) *Attorney, Agent, or Firm* — Patterson & Sheridan LLP

(57) ABSTRACT

A method or computer program product for color selection in a color image, including operations or instructions for selecting a base color in a base color portion of a color image; computing a perceptual color difference between the base color and a respective second color in the color image; comparing the perceptual color difference to a tolerance; and, identifying whether the color difference satisfies the tolerance.

11 Claims, 10 Drawing Sheets

COLOR SELECTION AND/OR MATCHING IN A COLOR IMAGE

CROSS-REFERENCE TO RELATED APPLICATIONS

Figure 1:
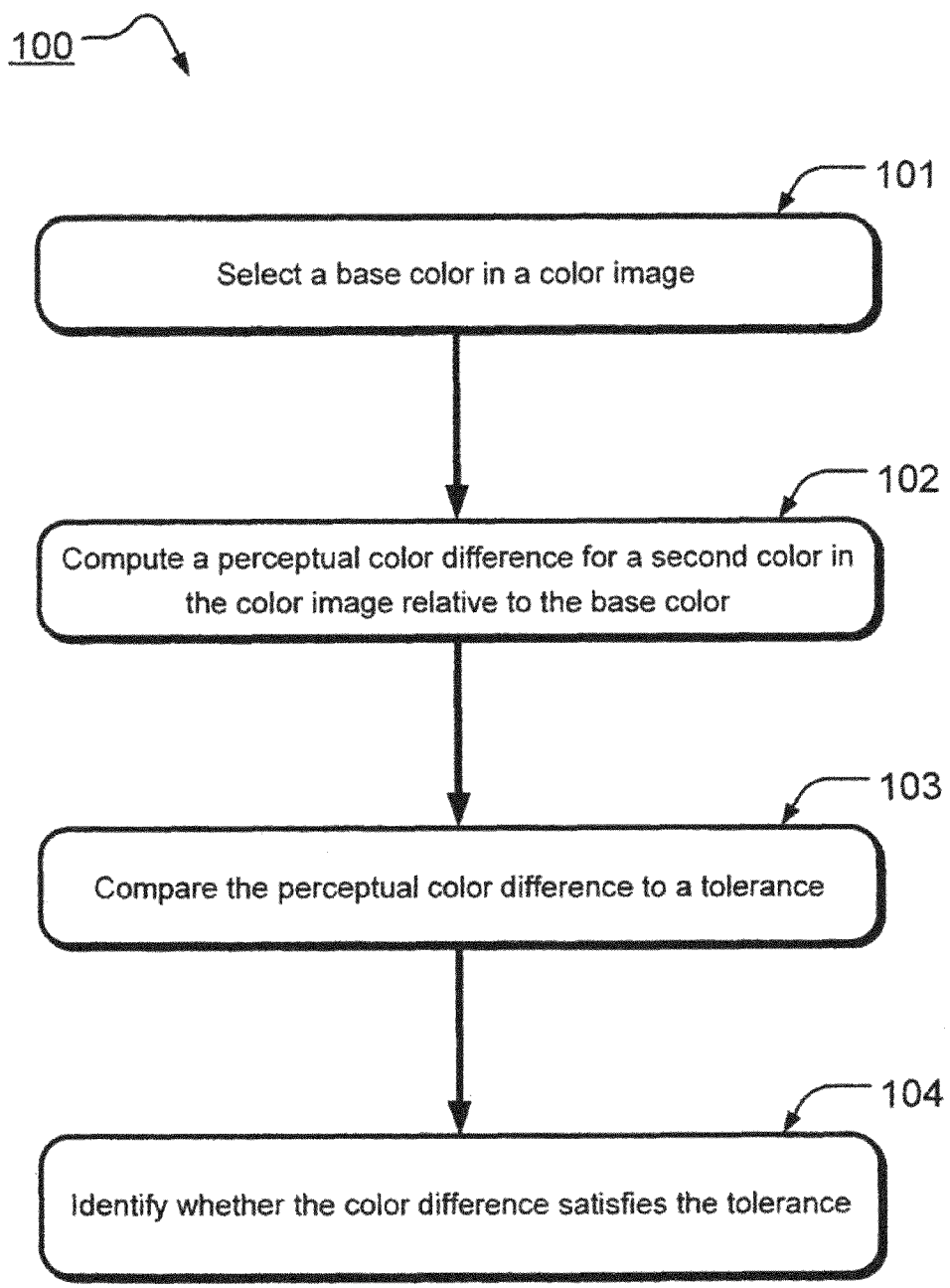

This application is a divisional of co-pending U.S. patent application Ser. No. 11/514,480 filed Aug. 31, 2006. The aforementioned patent application is herein incorporated by reference.

BACKGROUND

The patent or application file contains at least one drawing executed in color. Copies of this patent or patent application publication with color drawing(s) will be provided by the Office upon request and payment of necessary fee.

Color images such as digital photographs are currently editable in a variety of ways. For example, it is common in digital image editing to modify an image selectively. That is, an editing operation may be intended to be performed on only a portion of the entire image. Selective editing operations include copying or cutting to the clipboard, color modification (adjusting brightness, saturation hue, contrast, etc.), smoothing, sharpening or removing noise. To perform such an operation, however, a user must be capable of somehow communicating to the software which pixels of the digital image belong to the portion to be edited and which do not. It is further common in such cases that the set of pixels to be isolated for editing correspond to an actual object that existed in the scene that was photographed or otherwise digitally captured. For example, in a portrait, the user may wish to change the color of a subject's shirt. Therefore, it may be desired to select only those pixels corresponding to the fabric of the shirt. But even though the shirt may be made from a single solidly-colored fabric, the desired pixels may show color variations due to the interaction of scene lighting with the folds of the fabric. The challenge for the user would then be to select only the color variations of the shirt, without also including colors that do not belong to the shirt.

Existing solutions for isolating a portion of an image include selection tools such as a so-called "lasso" tool, where the user must carefully and manually trace around the region of the image, and the so-called "magic wand" tool, which performs color matching based on the encoded RGB pixel values; a method that models no physical principles of illumination nor any perceptual color attributes of the human visual system. In either case, general image editing tools require considerable experience, skill, experimentation and/ or tenacity in the user. The best choice in any particular situation may further depend upon the color matching task at hand. Even when the best conventional tool is chosen, it can be difficult to adjust the controls, particularly the tolerance, to provide the desired color or object identification or selection. Moreover, it is often the case that desired results cannot be obtained, particularly in color matching for selecting shading variations of a base color.

A practical example of this problem may be that of an online clothing merchandiser offering a particular style of a particular garment, but in several base fabric colors. It could prove beneficial to such an enterprise to have the ability to easily create digital images which could alternatively show any of a range of available colors, but without the need to take multiple photographs. A practical benefit would be obtained if they were able to easily, realistically and accurately select a colored object apart from any other portion of the digital image and then change the color of the selected object, after-the-fact, from a single photograph of a model.

SUMMARY

Implementations described and claimed herein address the foregoing and other situations by providing technology for matching a color of a region of a color image including a methodology of operations which may include a color matching method for selecting shading variations of a base color.

Thus, this technology relates generally to the field of digital image editing, or to an application that is used to edit digital raster images, and more specifically relates to the fields of color editing, matching and/or color correction. As a general concept, this technology computes a perceptual color difference between a reference color value and pixel-by-pixel values in an image. In this way, this invention can then provide for simply selecting image objects or regions by color.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTIONS OF THE DRAWINGS

FIG. 1 illustrates example operations for implementation of color identification and/or selection in a color image.

Figure 2A:
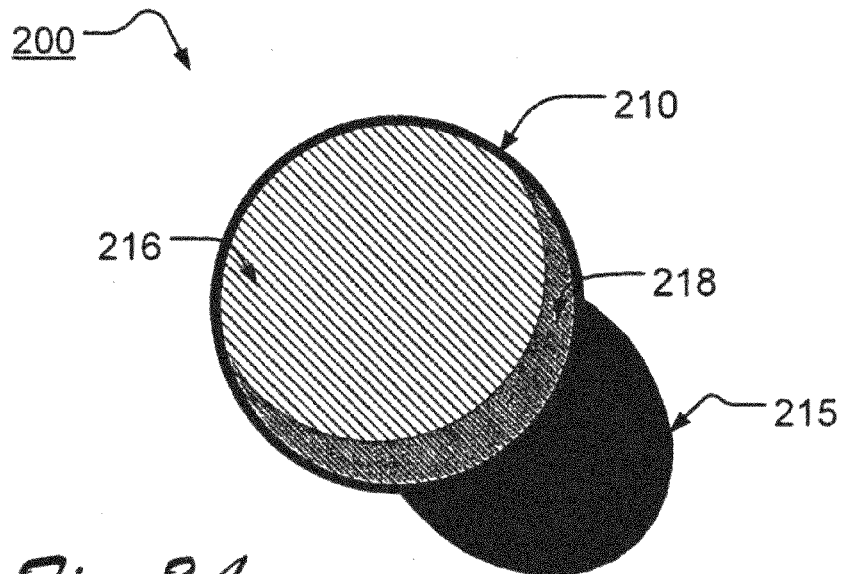
Figures 2B, 2C:
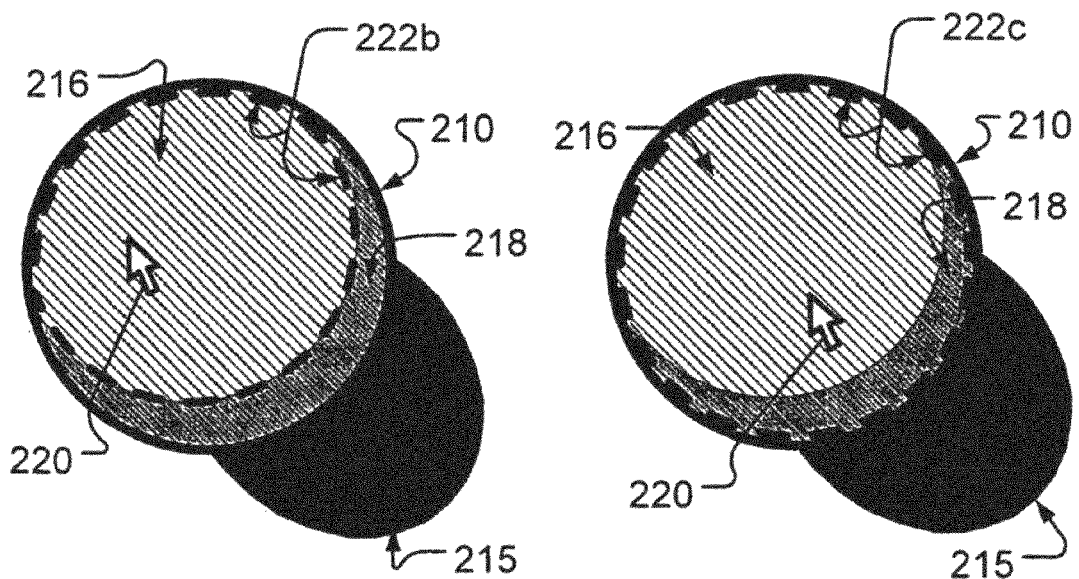

FIG. 2, which includes sub-part FIGS. 2A, 2B and 2C, provides views of a color image as originally colored and as a base color thereof may be selected.

Figure 3:
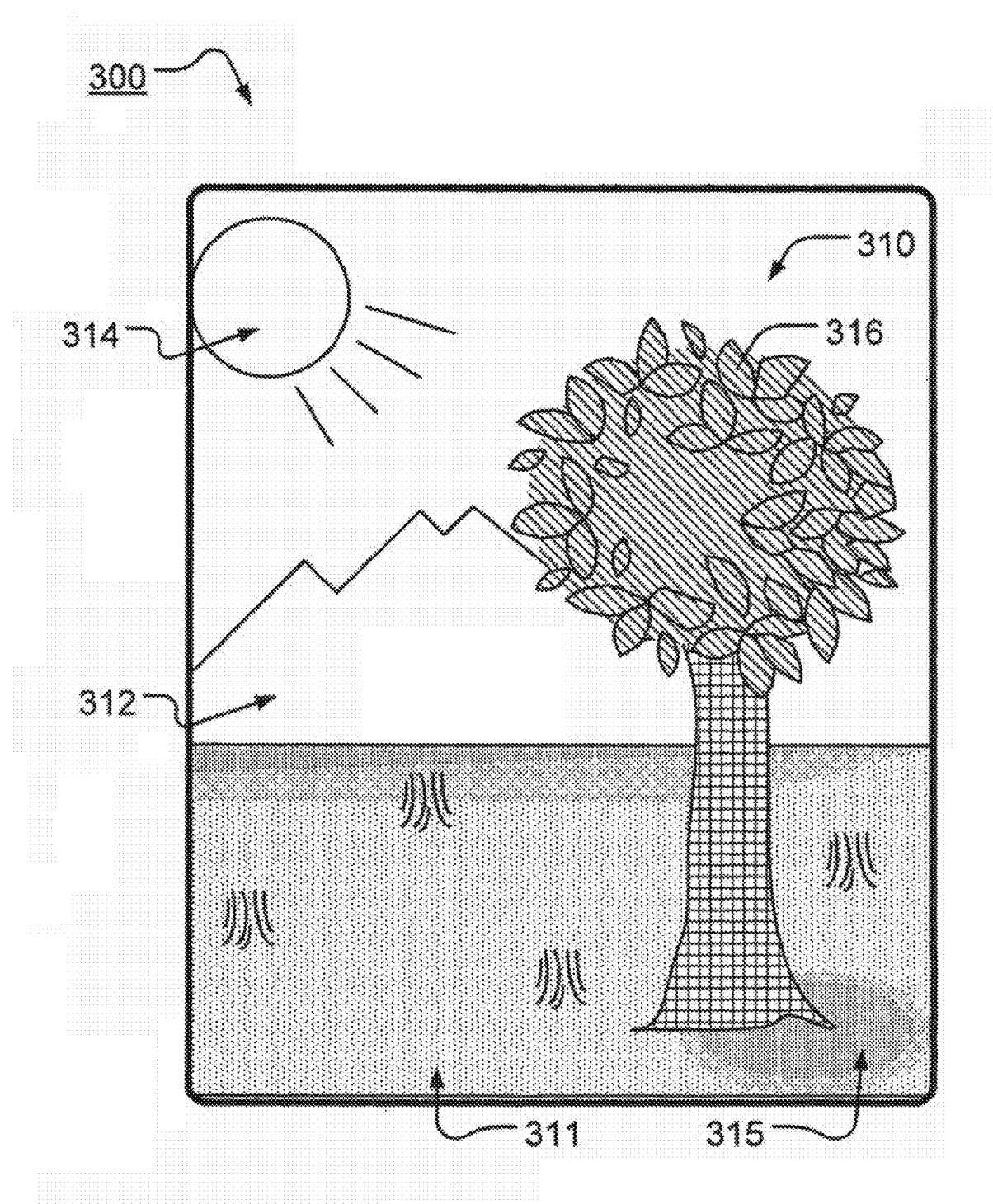

FIG. 3 provides a view of a color image.

Figure 4A:
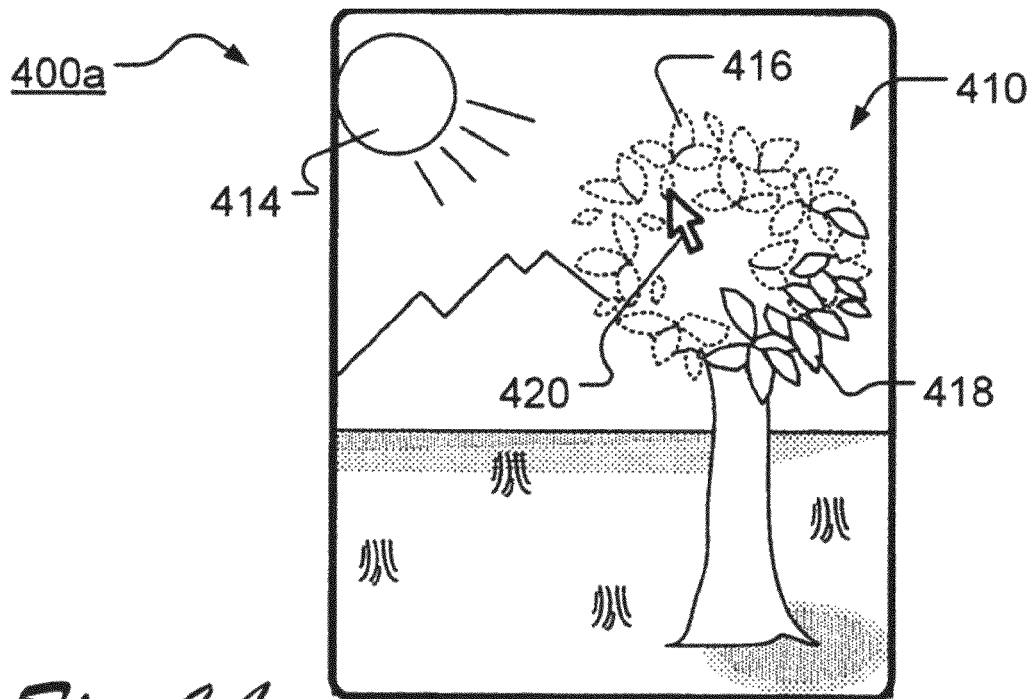
Figure 4B:
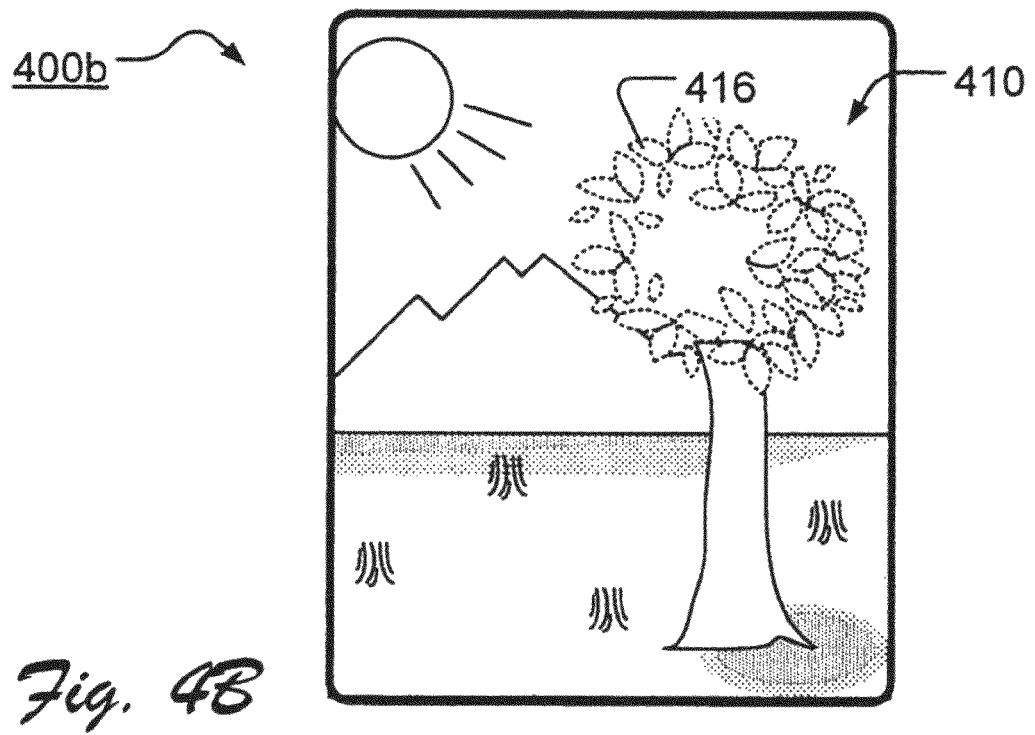

FIG. 4, which includes sub-part FIGS. 4A and 4B, provides respective views of an image like that in FIG. 3, with a base color selected.

Figure 5:
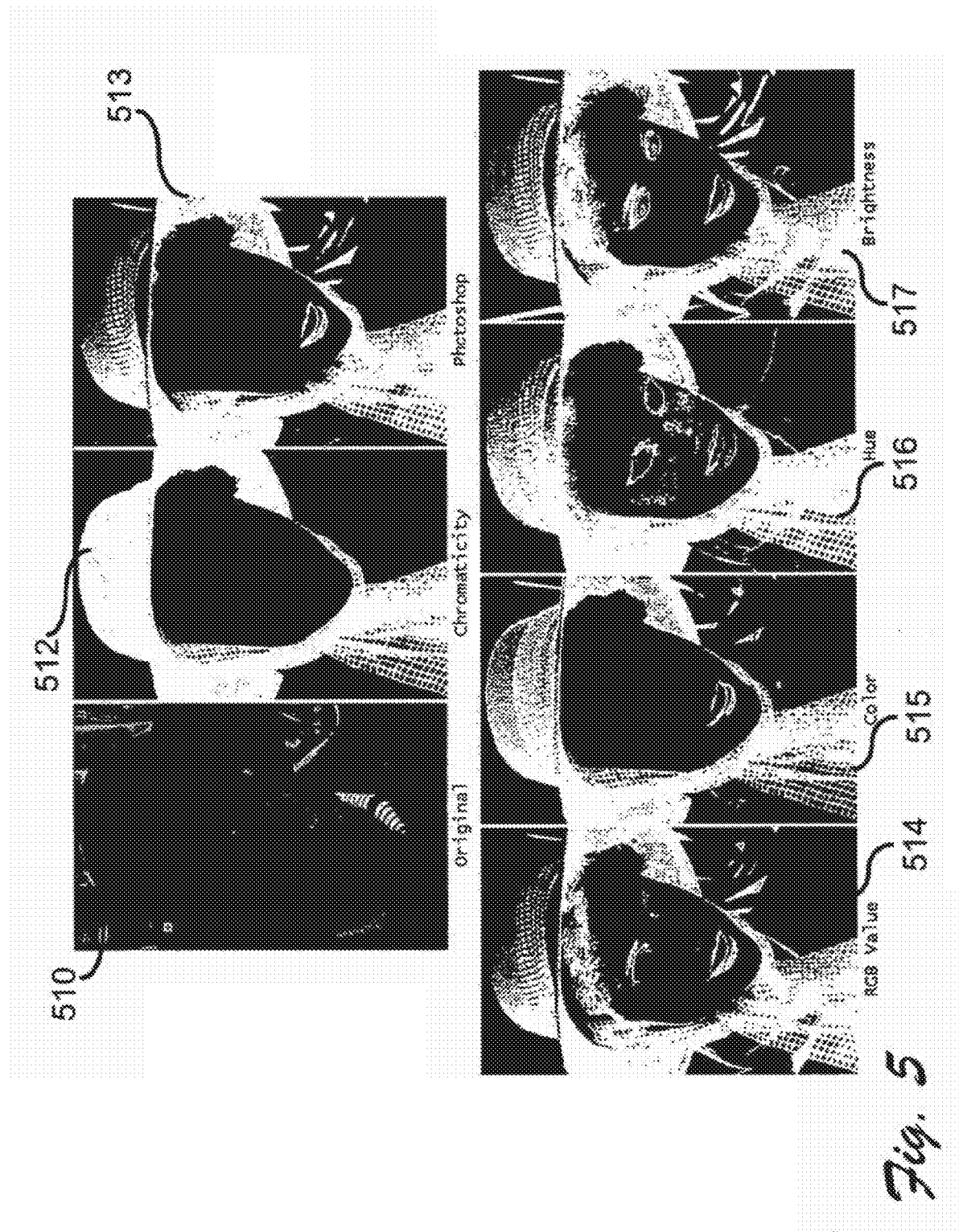

FIG. 5 provides respective views of a color image and a variety of attempts to select a portion thereof based upon a single base color in the image.

Figure 6A:
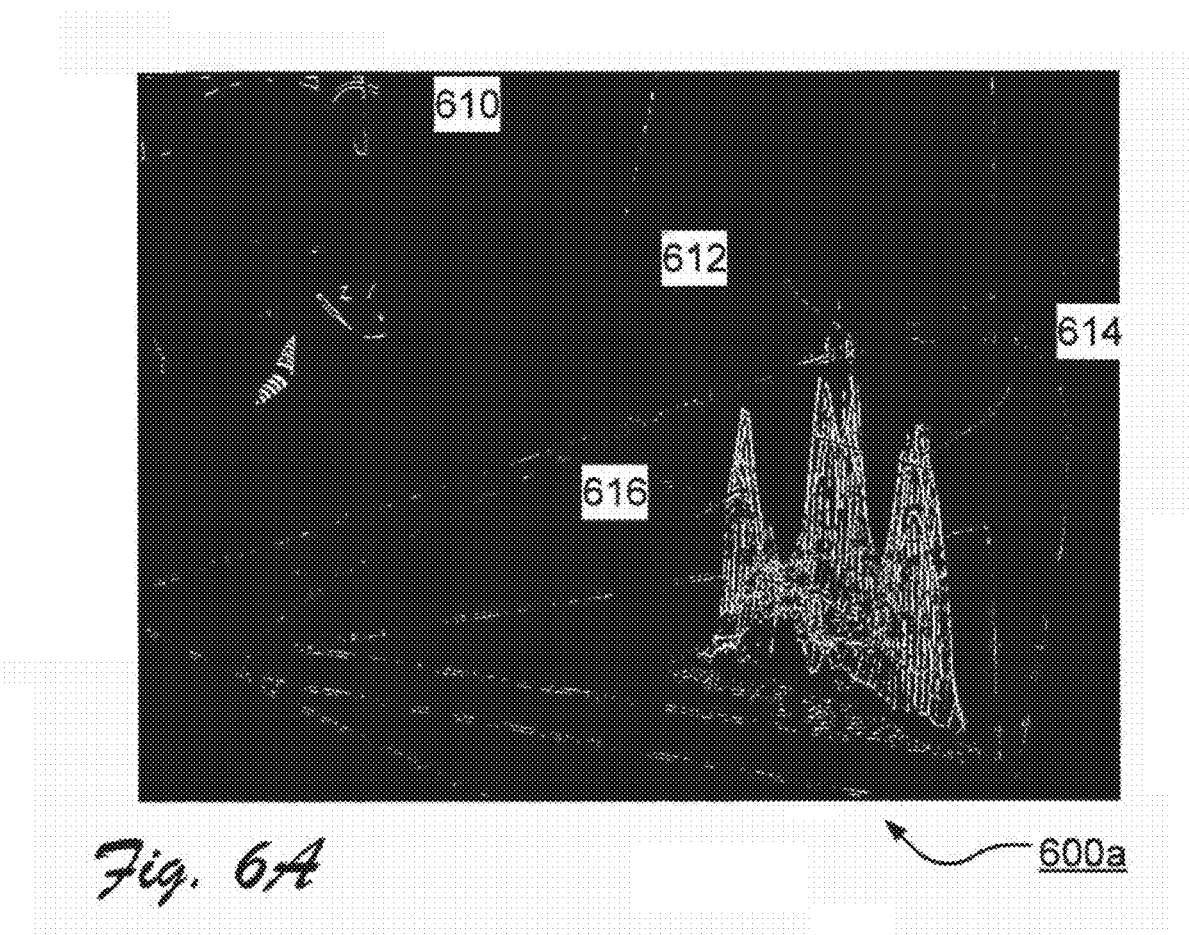
Figure 6B:
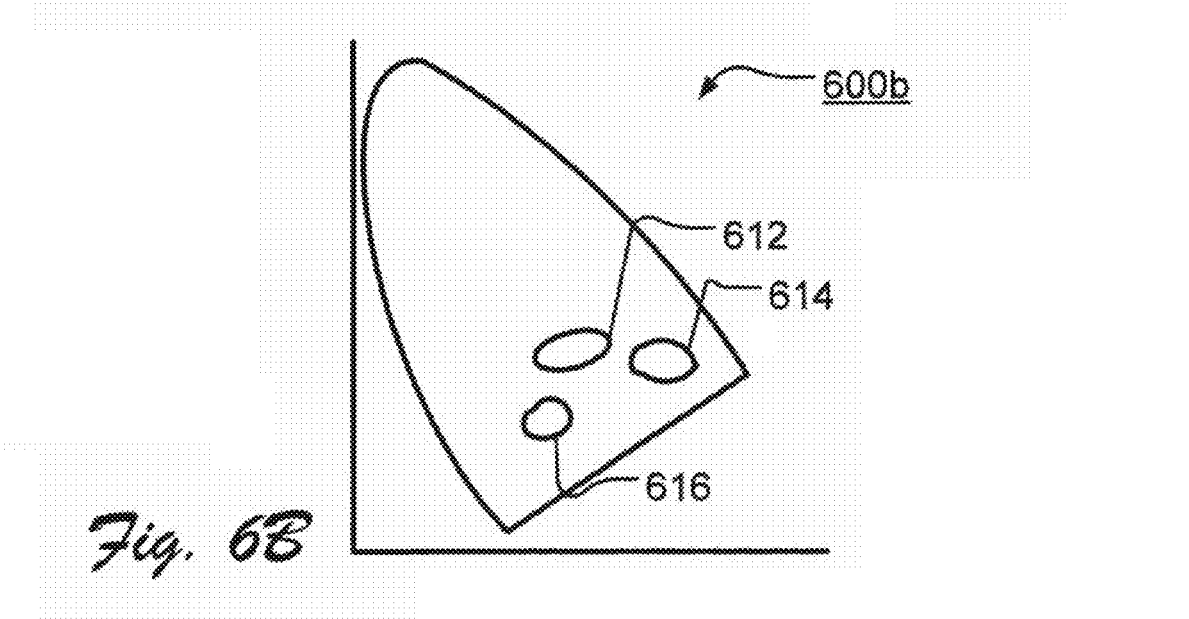

FIG. 6, which includes sub-part FIGS. 6A and 6B, provides views of chromaticity diagrams of a color image (inset).

Figure 7A:
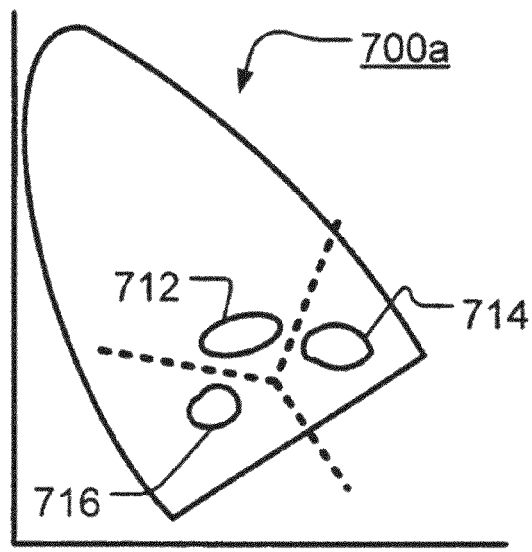
Figure 7B:
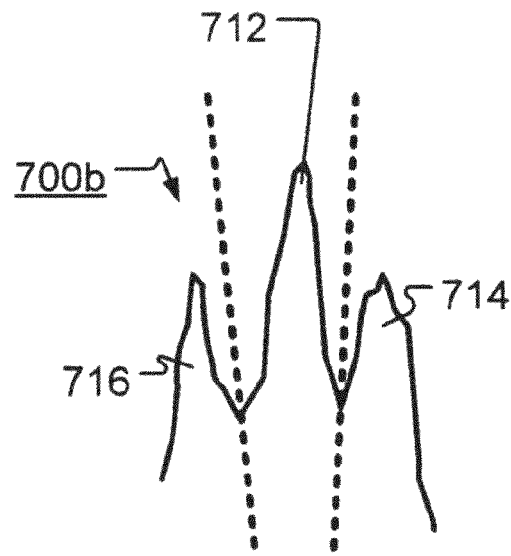
Figure 7C:
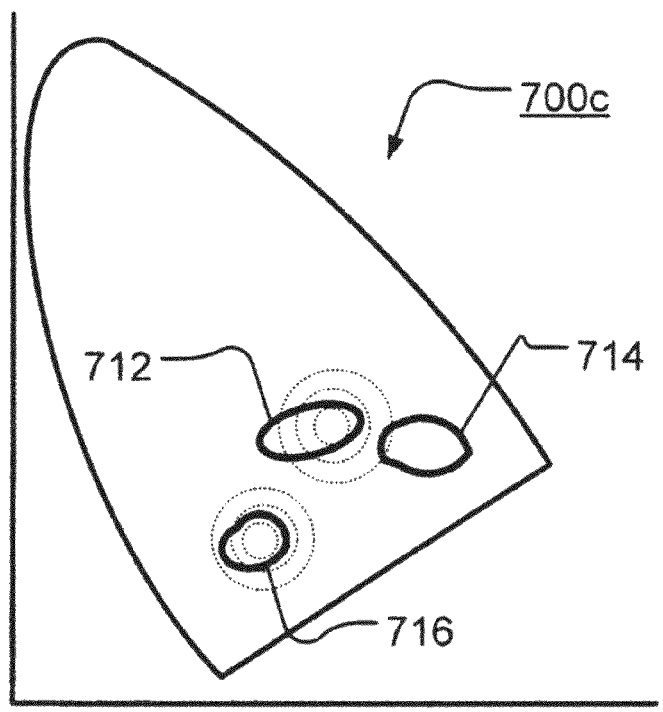

FIG. 7, which includes sub-part FIGS. 7A, 7B and 7C, provides views of chromaticity diagrams of a color image such as that shown in FIG. 6.

Figure 8:
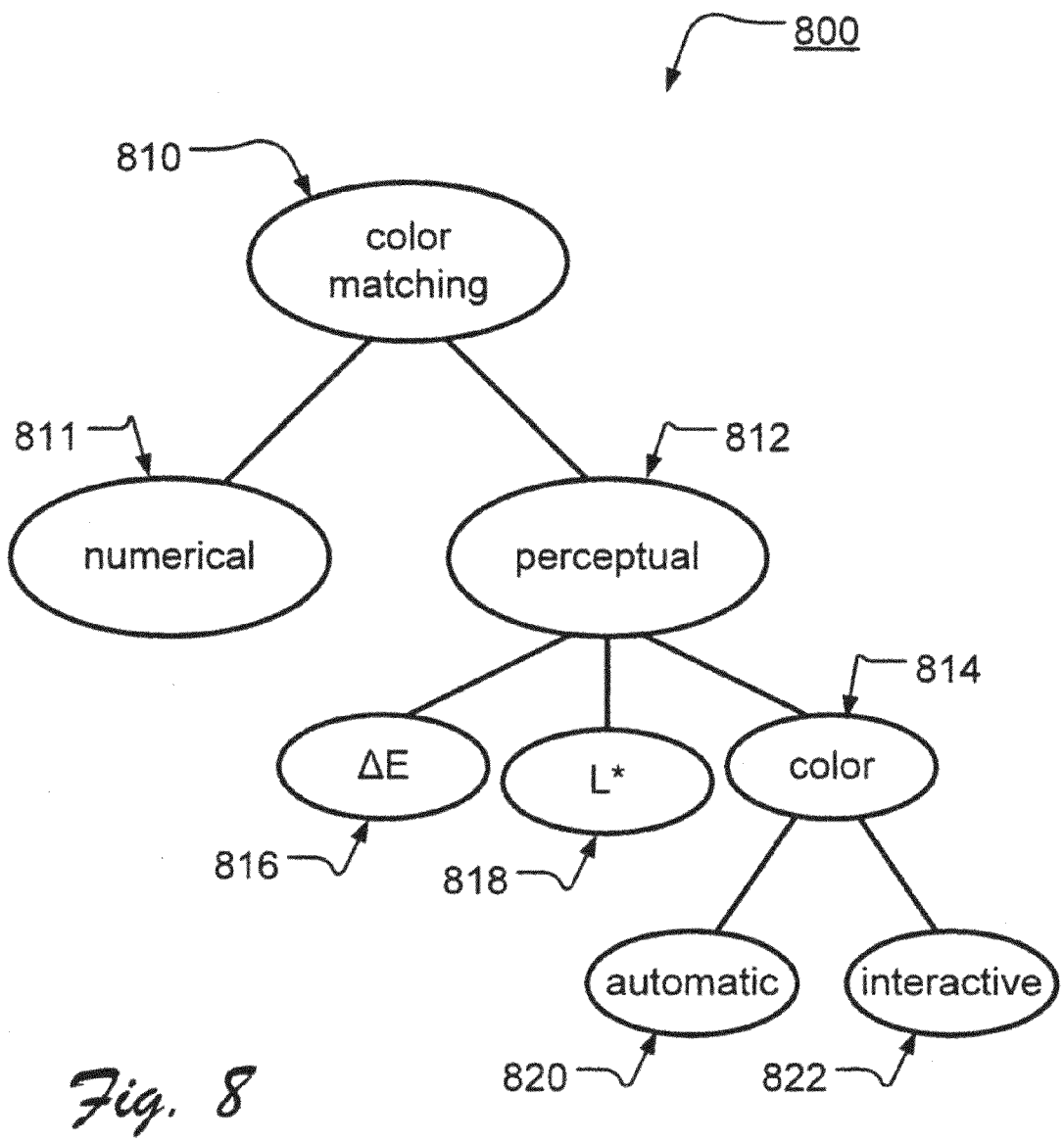

FIG. 8 provides a relational diagram of a plurality of color selection or matching methodologies.

Figure 9A:
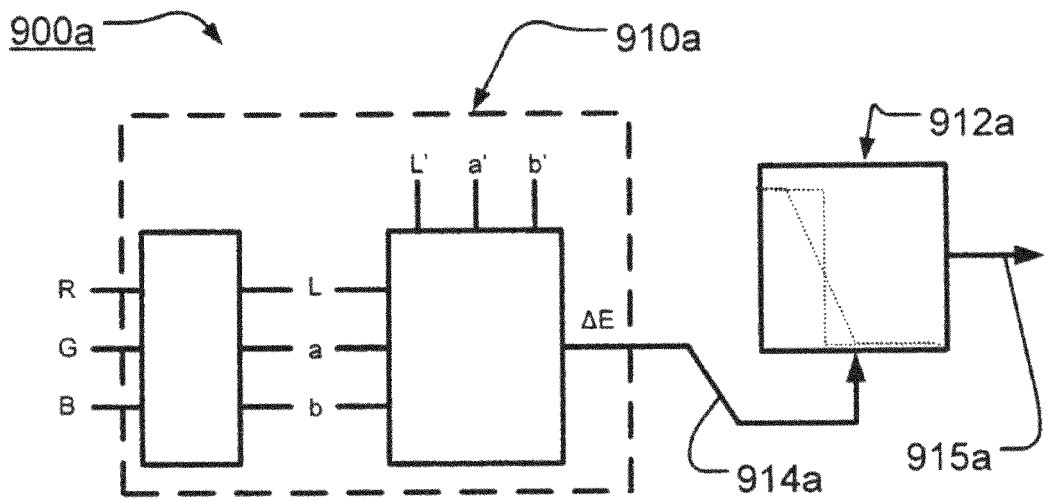
Figure 9B:
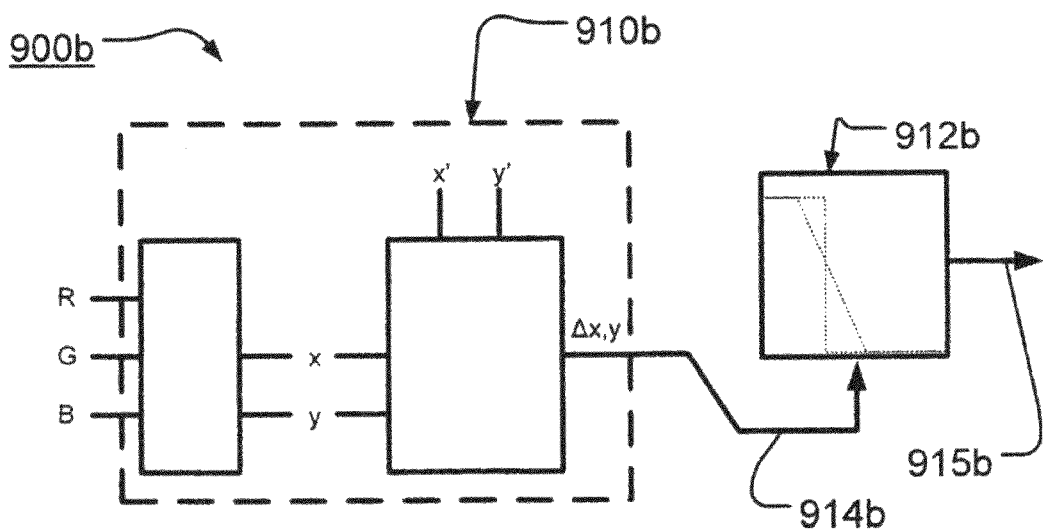

FIG. 9, which includes sub-part FIGS. 9A and 9B, provides schematic flow diagrams for example operations hereof.

Figure 10:
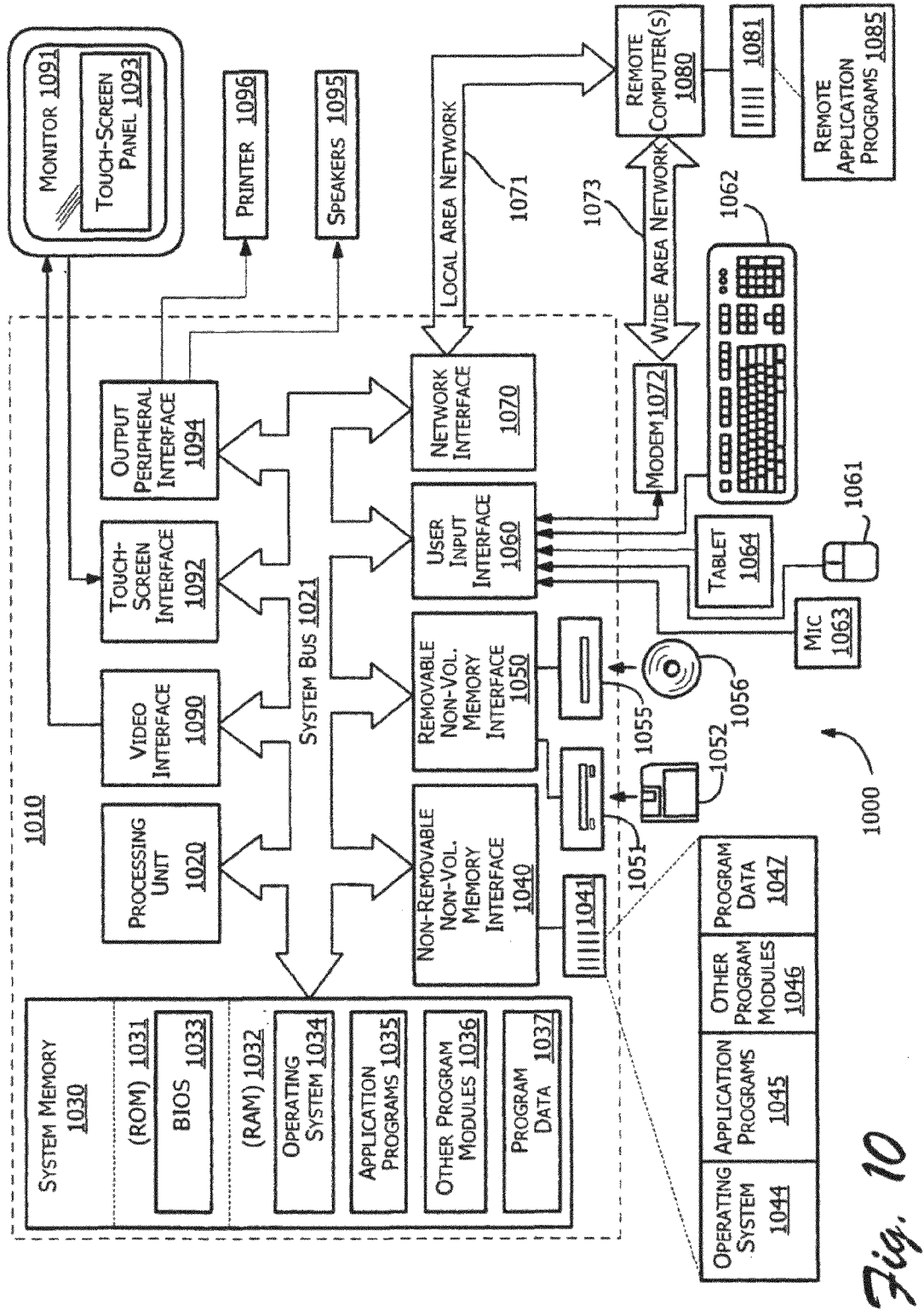

FIG. 10 illustrates a system that may be useful in implementing the described technology.

DETAILED DESCRIPTION

Technology is described herein for identifying or selecting a color in a digital color image. This technology can thus be used for selecting one or more portions or regions of a digital color image by color for any of many purposes, but, typically may be for the purpose of differential treatment of the selection relative to the rest of the image. As will be readily understood, such technology may provide for identification of the base color whether for mere object identification or for other image editing as for example in image portion copying, cutting and/or pasting, object or image region smoothing, sharpening or removing noise, or in color modification (adjusting brightness, saturation hue, contrast, etc.), re-colorization, color replacement, color removal, mere color removal to gray-scale, or for color re-use or matching or otherwise.

FIG. 1 illustrates an example methodology 100 for selecting and/or identifying a color in a portion of a color image. Such a method 100 may include operations 101, 102, 103 and 104 of respectively selecting a base color in an image; computing a color difference between the base color and a second color in the image; comparing the color difference to a tolerance; and identifying whether the color difference satisfies the tolerance. An alternative, slightly more detailed methodology may include respectively selecting a representative original base color in a portion or region of a color image; computing a color difference for each candidate pixel in the color image relative to the base color; comparing the color difference for each candidate pixel in the color image to a perceptual tolerance; and, setting a selection flag for or otherwise indicating the selection of each candidate pixel in the color image satisfying the perceptual tolerance. Note, these operations, particularly, operations 102, 103 and/or 104 may occur sequentially, either one before the other, or they may occur substantially simultaneously. In any event, this set of operations may be performed on a pixel by pixel basis using the color properties of each pixel to find or identify each pixel which satisfies the perceptual tolerance, as for example may occur in operation 103, to thereby discriminate the region having a common base color from the remainder of the image. This can thereby provide for image editing based upon the selected colored region regardless whether many of the selected pixels may have shading or other perceptual coloring variations as these naturally occur in a realistic color image. Note, the operation of identifying satisfaction of a tolerance (or similarly of setting the selection flag) is not intended to necessarily imply that a candidate pixel is either 100% in the selection, or 100% out of the selection. In practice, it may rather be useful to instead use a ramp in place of a step-function, to indicate a "probability" of sorts, which softens the edge of the selection, making the subsequent editing operation fit more seamlessly into the image as a whole.

Note, a method hereof may include analyzing the color content of the region to determine a base color regardless any shading or other light-induced or like characteristics present to alter the perceptual coloring thereof. Such shading or other characteristics would typically account for observed or observable variations of the base color in the digital image. Nevertheless the existence of such shading or light characteristics, the base color may be a single representative color of the object or area of the desired portion or region of the image.

As set forth in more detail below, the determination of the original base color can involve a mathematical relationship derived from the physics of light and color. Such an analysis may be performed on a selection of an original image color, as for example, on a pixel-by-pixel basis in a region or portion of a digital color image. An original base color for the region can be deduced from this analysis and/or an identification may be made of any or all pixels having such an original base color. This analysis and the model thereof may be thought of as identifying a region of an image having a particular base color, or as identifying any pixels matching the base color of the initially selected pixel color, whether shaded or otherwise. This analysis may also or alternatively be used to identify the selected base color, and/or to separate the base color from any shading parameter or parameters. After such an analysis, then image editing may be performed, as by copying, cutting/pasting, edge smoothing, or re-colorization with a user-supplied color (or texture map) which can be applied as a replacement for the original base color and the selection then re-rendered retaining the shading parameters. Either or both of the analysis and/or the re-rendering process can be interactive or fully automated.

As a first particularized example to introduce the concepts hereof, FIG. 2 provides a representation of a color image 200 (see FIGS. 2A, 2B and 2C), here a three-dimensional image of a sphere or ball 210. This ball 210 has an inherent color (e.g., green as indicated by the hatch marking convention) and a shading characteristic. A shadow 215 external of and below right of the ball 210 is shown to emphasize both the shading characteristics and the three dimensional quality of the ball. In FIG. 2A, the base color of the sphere is identified by the general reference numeral 216 and is represented by the hatch marking. The shading characteristic as indicated by the reference numeral 218 in/on the sphere or ball 210 is also perceptually apparent for the ball 210 in the lower right portion thereof. A conventional selection using a selection tool, such as the cursor 220 of FIG. 2B (also referred to in some conventional applications as a "magic wand" tool) might yield a color selection delineated by the dashed line 222b ("marching ants" style) which might pick up a substantial portion of the base color of the sphere 210, but not pick up, i.e., rather exclude the shaded area 218, even if the shaded area 218 is inherently of the same base color. According to the technology hereof, an improved color selection may be made as delineated by the dashed line 222c of FIG. 2C which captures therewithin both the shaded and non-shaded portions of the base color of the ball 210. Note, the selection would also exclude the shadow 215 and all other portions of the image. This would remain as described herein regardless where in the sphere the selection tool 220 is disposed for the selection. Note, examples of the typical types of images that may be involved herewith may include those where the color image is a two-dimensional pixel array often representing a three-dimensional scene captured with a digital camera, scanner or rendering program or other digital creation or capture means. Moreover, the region within such an image may correspond to/with one or more actual objects in the 3D scene that are made of a single base color (e.g., the color of the ball or sphere).

As a second example, FIG. 3 provides a representation of a discrete color image 300, here involving a three-dimensional scene including a tree 310 in a field 311 against a mountain backdrop 312. The tree 310 has inherent colors (e.g., green for the leaves and brown for the trunk) and due to the placement of the sun 314, there is also a shading characteristic, the shadow 315 external of and below the tree 310 being shown to emphasize both the shading characteristics and the three dimensional quality of the scene. In FIG. 3, the base color of the leaves of the tree is identified by the general reference numeral 316 and is represented by hatch marking (which according to convention represents the color green). A shading characteristic would also be perceptually apparent for and in the leaves of the tree, particularly in the leaves on the lower right side of the view, furthest from the sun 314, as these would also largely be in shadow (even though this characteristic is not directly shown here).

In scene 400a of FIG. 4A, the base color of the leaves of the tree 410 have been selected in a conventional fashion as shown by the cursor/pointer 420; the selected leaves of color 416 indicated by the dashed line leaf representations. As shown here in FIG. 4A, a number of the leaves have been selected as they would be by a traditional or conventional system; however, not all of the leaves have been selected here; the leaves in the lower right portion of the view, as indicated at 418, those furthest from the sun 414 and thus in substantial shadow, are still represented by solid lines as not having been included within the selection. Then, as shown in FIG. 4B, in an implementation of the present technology, the base color 416 is selected for all of the leaves of the tree 410, all of the leaves having been represented by dashed lines. Note, the selection may also be restricted to contiguous regions in image space. For example, if the field of green grass of FIG. 4B happened to be of the same base color as the leaves that the user clicked, the field could still be excluded from the selection because it is spatially separated from the leaves by the tree trunk, mountains and sky. Non-contiguous selections (e.g., including both the leaves and the grass field) may alternatively be obtained if desired.

Perceptual color variations may occur in an image as a result of shading or shadowing as demonstrated in FIGS. 2-4, or may result from other light or object-related issues in an image. Moreover, a variety of existing image editing programs operate by starting with a color clicked by the user, and then including other colors that are "similar" to this base color (sometimes also known as a seed color). But the measure of similarity used by these programs is very simplistic, generally including colors whose RGB values are within a manipulable but non-perceptually-based tolerance of the base or seed color. As such a tolerance is increased, more shades of the base or seed color are included in the selection, which is wanted behavior, but also more hues and saturation values, which may or may not be wanted behavior. The color metric used for such existing tolerance tests is not based on a physical model of color variations caused by scene illumination, nor is it based on principles of color vision. Note, there is a distinction between a "base color", a "seed color" and a "seed pixel." A seed color may be used to determine a base color, which might be a different color than the seed color. The color-matching selection process may thus start by (somehow) coming up with a seed color. There are several ways this seed color can be generated, a non-exhaustive list including: (a) a user clicks on an image pixel (a seed pixel) and the color of that pixel is the seed color; (b) the user defines the seed color by clicking on a seed pixel of a different image; (c) the user defines the seed color directly via a color picker—no seed pixel is involved; (d) the coordinates of the seed pixel are obtained from a database and that seed pixel determines the seed color; (e) the seed color is obtained from a database—no seed pixel is involved; or, (f) the seed color is determined adaptively and automatically by segmenting the image and automatically choosing the color of one or more of the resulting segments. Cases (d) and (e) might be used in an example, by an online clothing merchandiser. Case (e) might be used in an example application that automatically selects all skin tones in an image. Case (f) might be used in a still further example involving a machine vision application.

FIG. 5 provides examples of attempts to select all of the red hat and scarf of an original image 510, without selecting anything else from that image. The top center selection 512 shows an implementation of the present technology, where all of the hat and scarf (shown in white against a black background), and nothing else, is selected with a single click. The other selections 513, 514, 515, 516 and 517 of FIG. 5 show what would be obtained with existing conventional systems/methods. These other methods cannot select the entire hat and scarf without also selecting portions of the face, hair or backdrop, or selecting less than the entire hat and scarf. The resulting presentations of selections 512, 513, 514, 515, 516 and 517 are also referred to as selection masks which readily identify the selected or matched pixels as opposed to those not selected.

In the presently-disclosed methodologies, if a particular object or a group of two or more objects in an image have the same base color, the technology hereof may be used to identify a substantial number, if not all, of the pixels of an image having that same base color. Indeed, the technology hereof may offer such in one or more improvements over the conventional art. First, the technology hereof may include a recognition from color science principles that colors deriving from illumination interactions with a diffuse, i.e. matte, single base-colored subject or object share a common chromaticity coordinate, typically, a common CIE chromaticity coordinate. As a result, the technology hereof calls for the use of a chromaticity color system as opposed to a numerical or encoded color system such as the common RGB color space. An example chromaticity color system which may be used herein is the CIE chromaticity color system also known as the CIE xyY color space. Chromaticity color spaces are projective transformations of additive, linear-energy color systems such as CIE XYZ. For example, CIE xy chromaticity is computed from the CIE XYZ additive primaries as $x=X/(X+Y+Z)$ and $y=Y/(X+Y+Z)$. Other color spaces which may, for example, have some uses herein include the CIE Lab or $L*a*b*$ and/or CIE Luv or $L*u*v*$ color spaces. Such a color space may then be used for performing the pixel-by-pixel color identification or matching process hereof.

An example CIE xyY color space is shown in FIG. 6 corresponding to the inset original image 610 also shown in FIG. 5. More specifically, FIG. 6 provides in sub-FIGS. 6A and 6B examples of respective 2D chromaticity histograms 600a, 600b, showing the concentrations or clusters of pixels by color, as "mountain peaks" in FIG. 6A (note, the height of a peak is representative of the frequency of the corresponding base color in the image) and in plan view as rough circular or elliptical cross-sections in FIG. 6B. These respective clusters or concentrations 612, 614, 616 of pixels correspond to the dominant base colors in the inset image (red hat, skintone, and a pink backdrop). Such histograms thus indicate the dominant base colors in the image.

Segmenting such a histogram can then be performed interactively or substantially automatically to divide the respective clusters or peaks from each other, grouping or segmenting colors into similar segments. Examples of this are shown in FIG. 7. FIGS. 7A and 7B show schematically a substantially automated process, e.g., one which may be perforated by computer without interactivity, whereby the cross-sections of a 2D image 700a (FIG. 7A) or the peaks of a 3D image 700b (FIG. 7B) may be identified and/or separated one from another to segregate and/or otherwise group or identify the pixels belonging to a particular color/object. Thus, respective clusters/peaks 712, 714, 716 can be segregated and/or identified and/or selected. The shape of the cross-sectional segments of image 700a is not necessarily circular, and the extent of each shape may be automatically or substantially automatically determined by the segmentation process, thereby eliminating any need to set a tolerance value. The user may simply click on an object, the color of the object selects its segment, and all colors belonging to that same segment may then be included in the selection.

In an alternative, typically more often interactive process, a tolerance may be controlled by a slider (or other interactive user control feature) which controls the diameter of a circle on a chromaticity diagram (or the diameter of a cylinder on a three dimensional xyY plot); the circle intended to encircle or enclose a color concentration. See the growing circles surrounding the respective clusters 712 and 716 of FIG. 7C. Using a radius control to set the tolerance (as just described) may involve the user manually setting the tolerance limit (the radius). Also, by using a circle, the color inclusion boundary expands or contracts equally in all directions in the xy plane. Note, this circle method is shown working well for the cluster 716, but, less well for the cluster 712 of FIG. 7C, the larger circle/tolerance having encountered interference with cluster 714 before fully encircling the cluster 712. User interactivity may thus be useful to increase effectiveness, and the selection mechanism need not be restricted to circular, as other shapes may be useful as ellipses or non-smooth round or polygonal shapes. Nevertheless, these methodologies provide improvement in capturing shading variations of solid-colored objects in an imaged scene.

FIG. 8 provides a substantially hierarchical schematic 800 of several approaches to color selection or matching, see e.g., top level element 810. A first sub-element 811 represents a numerical or encoded methodology, which includes the substantially conventional use of an RGB color space with its use of its inherent non-perceptually based tolerances for color selection or matching. The present technologies rather reside in and under the other immediate sub-element 812 representing a variety of perceptually-based color selection or matching methodologies. Indeed, the two methodologies described in relation to FIG. 7 are shown here as the respective automated and interactive methods 820 and 822 listed in and/or under the general perceptual "color" methodology 814. These may also be referred to as 2D or xy methods because, as shown in FIG. 7, they may be implemented in two-dimensional space. Two other perceptual methodologies 816 and 818 are also shown, respectively for ΔE and for L*. These will now be further described.

The ΔE methodology may also be referred to as a perceptual or visual color difference, and is determined generally by determining a difference, on a pixel-by-pixel basis between the L*a*b* value of the color of each such pixel and a reference L*'a*'b*' color value, which is the color value, after conversion from RGB, of the pixel selected by the user for other pixel matching. This ΔE methodology typically will first involve a transform from the RGB space to the L*a*b* color space, which is a perceptually-based color space (where RGB is not) (note, color conversions among RGB, XYZ, xy and L*a*b* are known to those practiced in the art. A good reference to such is: Gunther Wyszecki, W. S. Stiles, "Color Science: Concepts and Methods, Quantitative Data and Formulae", Second Edition, John Wiley and Sons, 1982). Such an initial step or steps are shown for example in the flow diagram 900a of FIG. 9A, where the input RGB value enters on the left side of the conversion box 910a and is converted to the perceptual L*a*b* value, which is then compared to the reference L*'a*'b*' color value with a ΔE result (though not shown the reference L*'a*'b*' color value may have been converted from RGB as well). The ΔE result is then compared to a tolerance value or range of values, typically as set forth in a look-up table, see the tolerance box 912a, also alternatively referred to as a look-up table 912a. The chosen tolerance is set in this box or table 912a and by comparison, the input ΔE result may then be determined as to be included or not included in the color/object selection of the image. This process is then completed on a pixel-by-pixel basis (a ΔE result generated for each pixel) for all of the pixels of the image. Note more specifically, the "primed" or ' value, e.g., the L*'a*'b*' color value represents the originally selected color value, typically selected by a user as representative of the base color in the selected portion of the color image, and the respective un-primed L*a*b* values represent the pixel-by-pixel values to be compared therewith or thereagainst by calculation of the difference which is then compared to a tolerance (e.g., in tolerance box 912a). Note, with this process, a new tolerance can be chosen without having to run all of the ΔE results over if these ΔE results (see output ΔE identified by reference numeral 914a) are cached, and the tolerance simply re-set in the tolerance box or look-up table 912a (note, a step tolerance might be used, see the squared dash line in box/table 912a, or a sloped tolerance might be used to feather the pixel inclusions within the selection and soften the selection, see further description of these alternatives below). With all three of the L*a*b* values used in generating the ΔE results, this could also be referred to as a 3D solution. Note, there are several methods for computing ΔE (delta E) from L*a*b*: as for example, Delta E (CMC), Delta E (CIE 1976), Delta E (CIE 1994) and Delta E (CIE 2000), and a variety of similar methods.

The L* process 818 of FIG. 8 would operate in a similar manner either where only the L* value is converted from the RGB or more typically using essentially the same conversion box 910a of FIG. 9A, but, only calculating an L*–L* result, ignoring the a* and b* values (note, L* is the CIE Lightness Index, which is a uniform perceptual lightness scale). The L* process 818 would then be useful in comparing and matching perceptual lightness values without other color considerations. This may also be referred to as a one-dimensional solution.

The process of perceptual color 814 also referred to as a chromaticity process or method herein, whether automated or interactive might use a slightly different conversion box 910b in an overall process 900b as shown in FIG. 9B. The process 814 was described above; one further note here being the possibility that the conversion from RGB might be to a mere two dimensional x,y colorspace; hence being a 2D solution. Thus, in this process 814 and in FIG. 9B, Δx,y (or, "delta x,y") may represent a chromaticity color difference signal, which for example, when using a circular model for tolerance (see e.g., FIG. 7C), the difference signal might be calculated as $\Delta x,y = \sqrt{((x-x')^2 + (y-y')^2)}$ (also known or referred to as: the square root of the quantity $((x-x')^2 + (y-y')^2)$, or, sqrt((x-x')^2+(y-y')^2)) A tolerance box or look-up table 912b not unlike the box or table 912a of FIG. 9A might be used here as well for the comparison of the difference values 914b output from the conversion box 910b.

Note, when the comparison is performed in any of these methodologies, a color difference signal may be the result. A difference which yields, for example, a zero (0) value would be a substantial perfect match pixel for pixel, whereas a large value of the difference up to, for example 255 would represent a substantial opposite (e.g., black versus white), and not a match. The goal for matching and/or selection would be thus finding a difference in these chromaticity (x,y), lightness (L*) or perceptual (L*a*b* or L*u*v*) color spaces which yields sufficient matching. This is the tolerance. A sufficiently-well selected tolerance in the chromaticity, lightness or perceptual color space will provide a color match and appropriate selection. Indeed, FIGS. 9A and 9B indicate schematically by tolerance boxes 912a and 912b how an input "color difference signal" by the respective arrows 914a and 914b may be represented as entering into or intended to be used to compare against values within the respective tolerance boxes 912a and 912b; and then by respective second arrows 915a and 915b representing "selection signals" how these may be relative output signals exiting tolerance boxes 912a and 912b. In this manner, then, tolerance boxes 912a and 912b provide a process or means (typically through use of a look-up table) of converting a color difference signal into a selection signal.

Note as introduced above, a step tolerance of a single value might be used, see the squared dash line in either tolerance box or table 912a or 912b, or a sloped (linearly or nonlinearly) tolerance of graduated values might be used to feather the pixel inclusions within the selection and soften the selection. More particularly, a large selection signal, e.g. 100%, may indicate that the color under consideration is fully selected. A small selection signal of e.g., zero may, on the other hand, indicate that the color is not selected at all. A step tolerance of such sort may then indicate simply either selection or non-selection. In an alternative, a selection signal in between zero and 100% may in some circumstances represent the relative degree to which the color is to be included in the selection. In this latter case, the modified pixel color (as a result of whatever operation will eventually be applied to the selection) may be blended into the original pixel color according to the relative weight of the selection signal. An example may be presented as such: New Pixel Color=Modified Pixel Color*Selection Signal+Original Pixel Color*(100%−Selection Signal). Indeed, such a relationship (equation) may be applied to any or all of the selection results whether 100% selected, 0% selected or some other percent therebetween.

Note further that the difference values might be cached or otherwise calculated a single time for each pixel; however, the tolerance might be changeable and repeatedly applied to the otherwise cached pixel differences. This way, different tolerances might be tried without necessitating re-calculation of the color difference values each time a new tolerance is desired. A new selection mask could then be generated quickly and easily without re-calculation of the entire set of difference values. In some implementations, new or variable tolerances might be applied relatively quickly, perhaps even substantially instantaneously, with a selection mask substantially instantaneously graphically reflecting the results of the alternative tolerances, and thus of the selection group of pixels. This could be referred to as substantially instantaneous tolerance picking, where tolerance may be adjusted on the fly. An implementation might include a graphic slider tool that a user could move one way or another and substantially instantaneously see graphically represented as a selection mask different inclusion groups or selections of pixels.

The algorithm hereof may be substantially automated or automatic, though typically including a user-driven component. For a first example, the user may select the particular region of the image of which the base color will be determined or matched. When selecting a region of constant color, but different luminance (i.e. colors that share a common chromaticity coordinate), a cursor or other graphic user interface selection fool. (e.g., a magic wand tool) might be used. A particularly useful such selection tool may be one that operates in a chromaticity color space such as (x, y) or (u', v').

The typical result of such implementations is, as above, and as described herein, an easy-to-use, accurate and realistic method of matching, selecting and/or identifying colors in/of objects in images. These may prove useful in many areas of digital imaging, particularly while still retaining the shading characteristics or other non-base color contributions to an image. As a general principle, these implementations are unique because they are based on a physical shading model rather than heuristics. In many implementations, the technology is a combination of image processing, computer graphics and color science.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Example hardware and an operating environment are shown in FIG. 10 for implementing the technology hereof, these including a general purpose computing device in the form of a computer 1020, including a processing unit 1021, a system memory 1022, and a system bus 1023 that operatively couples various system components including the system memory to the processing unit 1021. There may be only one or there may be more than one processing unit 1021, such that the processor of computer 1020 comprises a single central-processing unit (CPU), or a plurality of processing units, commonly referred to as a parallel processing environment. The computer 1020 may be a conventional computer, a distributed computer, or any other type of computer; the invention is not so limited.

The system bus 1023 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 1024 and random access memory (RAM) 1025. A basic input/output system (BIOS) 1026, containing the basic routines that help to transfer information between elements within the computer 1020, such as during start-up, is stored in ROM 1024. The computer 1020 further includes a hard disk drive 1027 for reading from and writing to a hard disk, not shown, a magnetic disk drive 1028 for reading from or writing to a removable magnetic disk 1029, and an optical disk drive 1030 for reading from or writing to a removable optical disk 1031 such as a CD ROM or other optical media.

The hard disk drive 1027, magnetic disk drive 1028, and optical disk drive 1030 are connected to the system bus 1023 by a hard disk drive interface 1032, a magnetic disk drive interface 1033, and an optical disk drive interface 1034, respectively. The drives and their associated computer-readable media provide nonvolatile storage of computer-readable instructions, data structures, program modules and other data for the computer 1020. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 1029, optical disk 1031, ROM 1024, or RAM 1025, including an operating system 1035, one or more application programs 1036, other program modules 1037, and program data 1038. A user may enter commands and information into the personal computer 1020 through input devices such as a keyboard 1040 and pointing device 1042. Other input devices (not shown) may include a microphone, joystick, game pad, satellite dish, scanner, or the like. These and other input devices are often connected to the processing unit 1021 through a serial port interface 1046 that is coupled to the system bus, but may be connected by other interfaces, such as a parallel port, game port, or a universal serial bus (USB). A monitor 1047 or other type of display device is also connected to the system bus 1023 via an interface, such as a video adapter 1048. In addition to the monitor, computers typically include other peripheral output devices (not shown), such as speakers and printers.

The computer 1020 may operate in a networked environment using logical connections to one or more remote computers, such as remote computer 1049. These logical connections are achieved by a communication device coupled to or a part of the computer 1020; the invention is not limited to a particular type of communications device. The remote computer 1049 may be another computer, a server, a router, a network. PC, a client, a peer device or other common network node, and typically includes many or all of the elements described above relative to the computer 1020, although only a memory storage device 1050 has been illustrated in FIG. 10. The logical connections depicted in FIG. 10 include a local-area network (LAN) 1051 and a wide-area network (WAN) 1052. Such networking environments are commonplace in office networks, enterprise-wide computer networks, intranets and the Internet, which are all types of networks.

When used in a LAN-networking environment, the computer 1020 is connected to the local network 1051 through a network interface or adapter 1053, which is one type of communications device. When used in a WAN-networking environment, the computer 1020 typically includes a modem 1054, a network adapter, a type of communications device, or any other type of communications device for establishing communications over the wide area network 1052. The modem 1054, which may be internal or external, is connected to the system bus 1023 via the serial port interface 1046. In a networked environment, program modules depicted relative to the personal computer 1020, or portions thereof, may be stored in the remote memory storage device. It is appreciated that the network connections shown are examples only and other means of and communications devices for establishing a communications link between the computers may be used.

The technology described herein may be implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification provides a complete description of the methodologies, systems and/or structures and uses thereof in example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. In particular, it should be understood that the described technology may be employed in virtually all, if not indeed, all digital imaging. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

The invention claimed is:

1. A method on processing an image on a computer system comprising:
    processing a plurality of pixels comprising a predetermined portion of an image to generate a of chromaticity color values, each chromaticity color value relating to a pixel within the plurality of pixels and processed according to a predetermined chromaticity color space:
    converting the plurality of chromaticity color values to a distribution of the plurality of chromaticity color values:
    establishing a base color based upon identifying a peak within the distribution;
    establishing a mask; and
    applying with the processor the mask to the distribution in dependence upon at least the identified peak.

2. The method according to claim 1 wherein, the distribution is one of a histogram and a chromaticity diagram.

3. The method according to claim 1 wherein, the predetermined chromaticity color space is at least one of a CIE xyY, a CIE xy, a CIE Lab, a CIE Luv, and a CIE XYZ color space.

4. The method according to claim 3 wherein, when the at least one of is the CIE xy color space the chromaticity is computed from CIE XYZ primaries according to $x=X/(X+Y+Z)$ and $y=Y/(X+Y+Z)$.

5. The method according to claim 1 wherein, applying the mask to the distribution comprises at least one of segmenting the distribution and enclosing a concentration of pixels plotted in the distribution.

6. The method according to claim 1 wherein, establishing the mask comprises establishing a region including the identified peak, the region having a dimension established in dependence upon at least one of fixed value, a value determined according to a predetermined function relating to the identified peak, and a value determined in dependence of a user input.

7. The method according to claim 1 wherein, establishing the mask comprises establishing a region including the identified peak and defined by a periphery, the periphery having the shape of at least one of a circle, an ellipse, a polygon, and a non-smooth shape.

8. The method according to claim 7 wherein, defining the periphery comprises defining at least a dimension of the periphery in dependence upon at least one of a predetermined value, a value determined according to a predetermined function relating to the identified peak, and a value determined in dependence of a user input.

9. The method of claim 1 further comprising; applying a predetermined process to all the pixels having chromaticity color values within the region of the distribution as defined by the mask; and presenting the result of the predetermined process to a user to determine a response from the user of result of applying the process to the image.

10. The method of claim 9 further comprising:
    Determining in dependence upon the response from the user whether to accept the result of applying the predetermined process or adjust an aspect of applying the predetermined process by adjusting the mask applied.

11. The method of claim 10 wherein, wherein adjusting an aspect does not result in a repetition of generating the distribution of the plurality of chromaticity color values.

* * * * *